United States Patent
Dylewski et al.

(10) Patent No.: US 12,480,403 B2
(45) Date of Patent: Nov. 25, 2025

(54) LOADING VANES ONTO A WHEEL

(71) Applicant: SAFRAN AIRCRAFT ENGINES, Paris (FR)

(72) Inventors: Nicolas Pierre Dylewski, Moissy-Cramayel (FR); Nathan Schaal, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/688,727

(22) PCT Filed: Sep. 5, 2022

(86) PCT No.: PCT/FR2022/051676
§ 371 (c)(1),
(2) Date: Mar. 1, 2024

(87) PCT Pub. No.: WO2023/031570
PCT Pub. Date: Mar. 9, 2023

(65) Prior Publication Data
US 2024/0384654 A1 Nov. 21, 2024

(30) Foreign Application Priority Data
Sep. 6, 2021 (FR) .................................... 2109321

(51) Int. Cl.
*F01D 5/02* (2006.01)
*B25J 15/00* (2006.01)

(52) U.S. Cl.
CPC ............ *F01D 5/02* (2013.01); *B25J 15/0033* (2013.01); *F05D 2220/323* (2013.01); *F05D 2230/68* (2013.01)

(58) Field of Classification Search
CPC .. F01D 5/02; F01D 5/027; F01D 5/303; B25J 15/0033; B25J 9/1679; F05D 2220/323;
(Continued)

(56) References Cited

U.S. PATENT DOCUMENTS 4,711,007 A * 12/1987 Conrad ................. B23P 15/006
29/525
10,458,425 B2 * 10/2019 Boyer ................... F04D 29/644
(Continued)

FOREIGN PATENT DOCUMENTS

JP 6025670 A 2/1985
WO 2020/202363 A1 10/2020

OTHER PUBLICATIONS

Dammann et al., "Automated selection and assembly of sets of blades for jet engine compressors and turbines", 43rd North American Manufacturing Research Conference, Procedia Manufacturing, vol. 16, Jan. 1, 2018 pp. 53-60.
(Continued)

*Primary Examiner* — Lawrence Averick
(74) *Attorney, Agent, or Firm* — WOMBLE BOND DICKINSON (US) LLP (57) ABSTRACT

A method for loading blades onto a wheel by an articulated arm, including determining a list of blades which are intended to succeed one another along a guideway of the wheel in the order of this list, in a predefined direction of rotation from a notch until returning to this notch, such that the list has a predefined number of blades at a first end, termed first end blades, and a predefined number of blades at a second end of the list, termed second end blades, each of the first end blades having a circumferential size which is less than each of the second end blades; and—commanding the articulated arm so that the gripper seizes the blades and loads them into the notch according to the order of the list.

8 Claims, 9 Drawing Sheets

(58) Field of Classification Search
CPC ........... F05D 2230/68; F05D 2260/961; F04D 19/02; F04D 29/644; B23P 15/006; B23P 19/04
See application file for complete search history.

(56) References Cited

U.S. PATENT DOCUMENTS

| | | | |
|---|---|---|---|
| 2006/0275127 A1* | 12/2006 | Borufka | F01D 5/26 416/203 |
| 2009/0183349 A1* | 7/2009 | Walsh | F01D 25/285 29/889 |
| 2021/0402535 A1* | 12/2021 | Teramoto | F01D 25/285 |
| 2022/0172336 A1* | 6/2022 | De Agostini | F01D 25/24 |

OTHER PUBLICATIONS

International Search Report received for PCT Patent Application No. PCT/FR2022/051676, mailed on Jan. 2, 2023, 7 pages (3 pages of English Translation and 4 pages of Original Document).

\* cited by examiner

LOADING VANES ONTO A WHEEL

TECHNICAL FIELD OF THE INVENTION

This invention concerns the loading of vanes onto a wheel. It is used in particular in the aeronautical industry, for the manufacture of a rotor of a turbojet engine.

TECHNOLOGICAL BACKGROUND

Vanes are known to be loaded onto a turbocharger rotor wheel by manually loading the vanes into a notch in a circular slideway on the wheel.

More specifically, a first assembling of the vanes, referred to as the blank assembling, is carried out manually to adjust the circumferential clearance.

It is necessary to maintain a clearance between the vanes during assembling, to compensate for the thermal expansion of the parts as the temperature rises in the turbojet engine.

To achieve this, it is known to use two types of vanes-narrow and wide-differing in the circumferential size of their platform, which allows, by a judicious choice of the number of vanes of each type, to obtain a clearance as close as possible to the minimum of the tolerance interval provided in the specifications.

Firstly, an operator assembles a certain number of narrow and wide vanes, then proceeds by successive iterations until a minimum clearance within the tolerance interval is achieved.

The vanes are then dismantled and the identification characters carried by the vanes are read by an operator, who also weighs them.

Based on this information, a software is used to determine the circumferential positioning of the vanes allowing to minimise unbalance.

Finally, an operator carries out the final assembly of the vanes according to the order indicated by the software, as well as assembling bolts to immobilise the vanes.

During this process, the blank assembling and the disassembling are time-consuming, even though they only serve to measure the clearance. Moreover, there is a high risk of impact to the parts, due to the numerous manipulations involved. As for the character-reading phase, which is stressful and repetitive for the operators, it can lead to eye fatigue and entails a major quality risk linked to errors in manual data entry (human factors).

It may therefore be desirable to provide a method for loading vanes onto a wheel which avoids at least some of the above-mentioned problems and constraints.

SUMMARY OF THE INVENTION

A method is therefore proposed for loading vanes onto a wheel comprising a circular slideway having a notch for loading the vanes, by means of an articulated arm having one end equipped with a vane gripper, the method comprising:
  determining a list of vanes to succeed one another along the slideway in the order of that list, following a predefined direction of rotation from the notch to return to that notch, such that the list has a predefined number of vanes at a first end, referred to as first end vanes, and a predefined number of vanes at a second end of the list, referred to as second end vanes, each of the first end vanes having a smaller circumferential size than each of the second end vanes; and
  controlling the articulated arm so that the gripper seizes and loads the vanes into the notch in the order listed.

The invention makes it easy to replace narrow vanes located at one end with wide vanes, or wide vanes located at the other end with narrow vanes, in order to adjust the circumferential clearance of the loaded vanes.

Optionally, each of the vanes in the list between the first and second end vanes has a greater weight than each of the first and second end vanes.

Optionally, the vanes in the list have decreasing weights from a middle of the list towards each end of the list.

Optionally, the method also comprises:
  measuring the circumferential clearance of the loaded vanes;
  if the circumferential clearance is too small, replacing one or more first end vanes with one or more vanes having a larger circumferential size; and
  if the circumferential clearance is too large, replacing one or more second end vanes with one or more vanes of smaller circumferential size.

Also optionally, the articulated arm comprises a safety system for measuring a force exerted on the gripper and stopping the articulated arm when this force exceeds a predefined threshold, comprising:
  controlling the articulated arm to position the gripper radially opposite, with respect to an axis of rotation of the rotor, a notch provided in the stage for inserting the vanes;
  controlling the articulated arm to move the gripper radially in the direction of the notch until the articulated arm is stopped by the safety system following the encounter of the gripper with the rotor; and
  determining a radial position of the notch from the position of the gripper when the articulated arm has been stopped by the safety system;
  and in which controlling the articulated arm to load the vanes comprises inserting the vanes one by one into the notch at the determined radial position, in the order of the list.

Also optionally, a camera is attached to the end of the articulated arm and the method further comprises:
  controlling the articulated arm to move the camera along a circle centered on the axis of rotation of the rotor, as well as parallel to the axis of rotation, while keeping the camera oriented radially, in order to center the position of the notch in the image provided by the camera; and
  determining an azimuthal position and a position along the axis of rotation of the notch, the control of the articulated arm so that the gripper seizes and inserts the vanes one by one into the notch also being carried out on the basis of the azimuthal positions and positions along the axis of rotation determined.

Also optionally, the method also comprises:
  a photograph of a plate on which the vanes to be loaded are arranged; and
  analysing the photograph to determine the positions of the vanes on the plate.

Also optionally, the wheel can also be part of a rotor of a turbojet engine.

Also proposed is an installation for manufacturing a propeller, the propeller comprising a circular slideway having a notch for loading vanes, comprising:
  an articulated arm with one end equipped with a vane gripper;
  a computer device adapted to determine a list of vanes intended to succeed one another along the slideway in the order of this list, following a predefined direction of rotation from the notch to return to this notch, so that the list has a predefined number of vanes at a first end, referred to as first end vanes, and a predefined number of vanes at a second end of the list, referred to as second end vanes, each of the first end vanes having a smaller circumferential size than each of the second end vanes; and a computer device designed to control the articulated arm so that the gripper seizes and loads the vanes into the notch according to the order of the list.

Also proposed is a rotor of a turbojet engine comprising a bladed wheel obtained by a vane loading method according to the invention.

Also proposed is an aircraft comprising a turbojet engine equipped with a rotor of a turbojet engine according to the invention is also proposed.

BRIEF DESCRIPTION OF THE FIGURES

The invention will be better understood with the aid of the following description, given only by way of example and made with reference to the attached drawings in which.

DETAILED DESCRIPTION OF THE INVENTION

Figure 1:
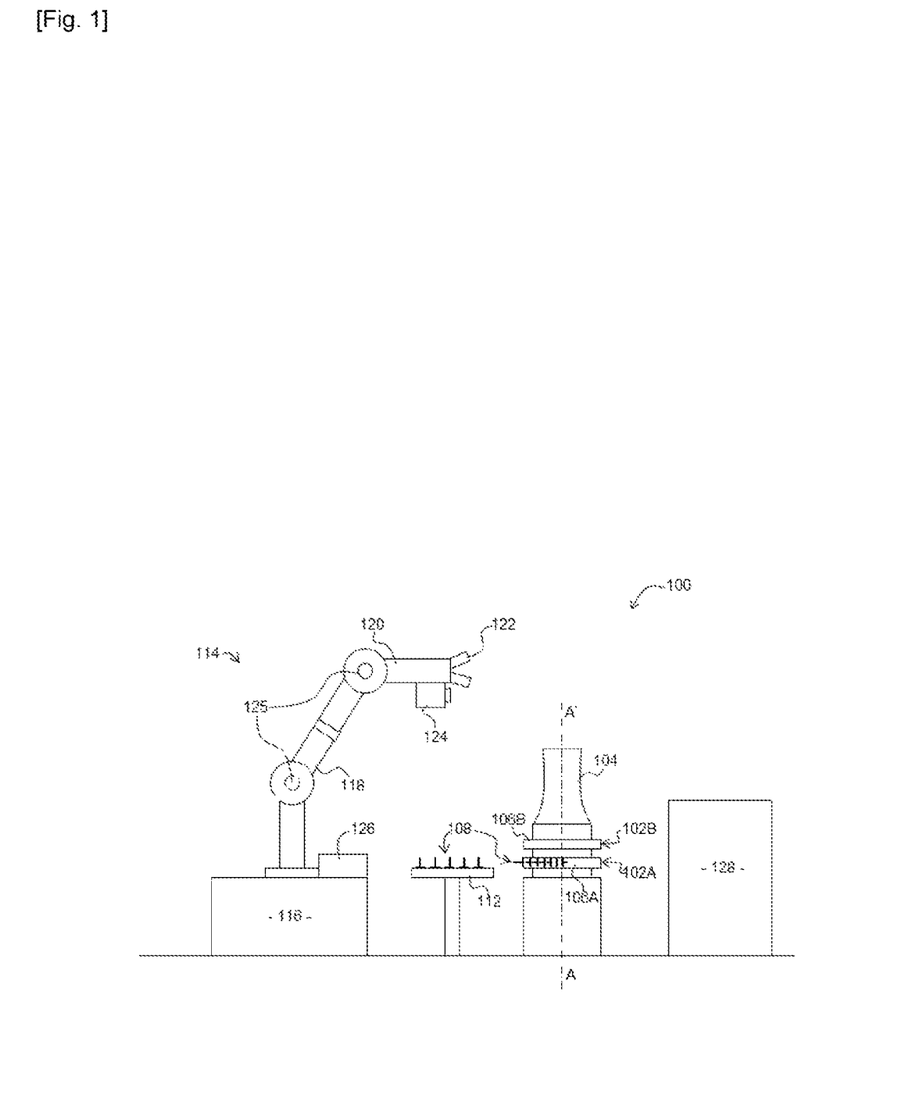
FIG. 1 is a very simplified side view of an installation according to the invention for loading vanes onto a wheel of a rotor of a high-pressure compressor of a turbojet engine.

With reference to FIG. 1, an example of an installation 100 according to the invention for mounting a bladed wheel (i.e., a wheel on which vanes have been loaded) belonging, for example, to a rotor 104 of a high-pressure compressor of a turbojet engine will now be described. The term "bladed wheel" also generally covers all types of propeller and fan.

Generally speaking, the rotor 104 has an axis of rotation AA' and comprises, along the latter, several stages comprising respective wheels 102A, 102B also having the axis AA' as the axis of rotation. Each wheel 102A, 102B comprises a circular slideway 106A, 106B (for example in the form of a groove) around the axis of rotation AA' and vanes 108 are loaded into this slideway 106A, 106B to form a bladed wheel. The term "vane" also covers any type of blade.

In FIG. 1, the wheel 102A is partially mounted, i.e. only some of the vanes 108 have been loaded into the circular slideway 106A. The assembling of the wheel 102B has not yet begun.

The installation 100 firstly comprises a frame 110 on which the rotor 104 is intended to be placed, with its axis of rotation AA' extending vertically in the example described.

The installation 100 also comprises a plate 112 for displaying vanes 108 designed to be loaded into one of the circular slideways 106A, 106B.

The installation also comprises a robot 114 for handling the vanes 108.

The robot 114 comprises a pedestal 116 and an articulated arm 118 projecting from the pedestal 116. The articulated arm 118 comprises several successive segments.

In the example shown, each of these segments can rotate relative to the neighbouring segment or segments along an axis of rotation. The last of the segments forms an end 120 of the articulated arm 118.

The robot 114 also comprises a vane gripper 122 and a camera 124, both attached to the end 120 of the articulated arm 118. In the example described, the gripper 122 comprises a clamp with specific jaws to adapt to the shape of the vanes.

The robot 114 is preferably a collaborative robot (also referred to as a "cobot") which has a measuring device 125 designed to measure an effort exerted by the gripper 122 on its environment. For example, the measuring device 125 comprises torque sensors in one or more of the axes of rotation, allowing it to measure the force exerted by the gripper 122 as it moves and to react accordingly.

In particular, the robot 114 comprises a safety system (not shown) designed to use the measured force and to bring the articulated arm 118 to an emergency stop when this force exceeds a predefined threshold. Following this emergency stop, the reactivation of the articulated arm 118 generally requires a manual resetting by the operator.

The robot 114 also comprises a computer device 126 for controlling the articulated arm 118, the gripper 122 and the camera 124. For example, the computer device 126 is supported by the pedestal 116.

The installation 100 also comprises a system 128 for identifying the vanes 108, which will be described in more detail later.

Figure 2:
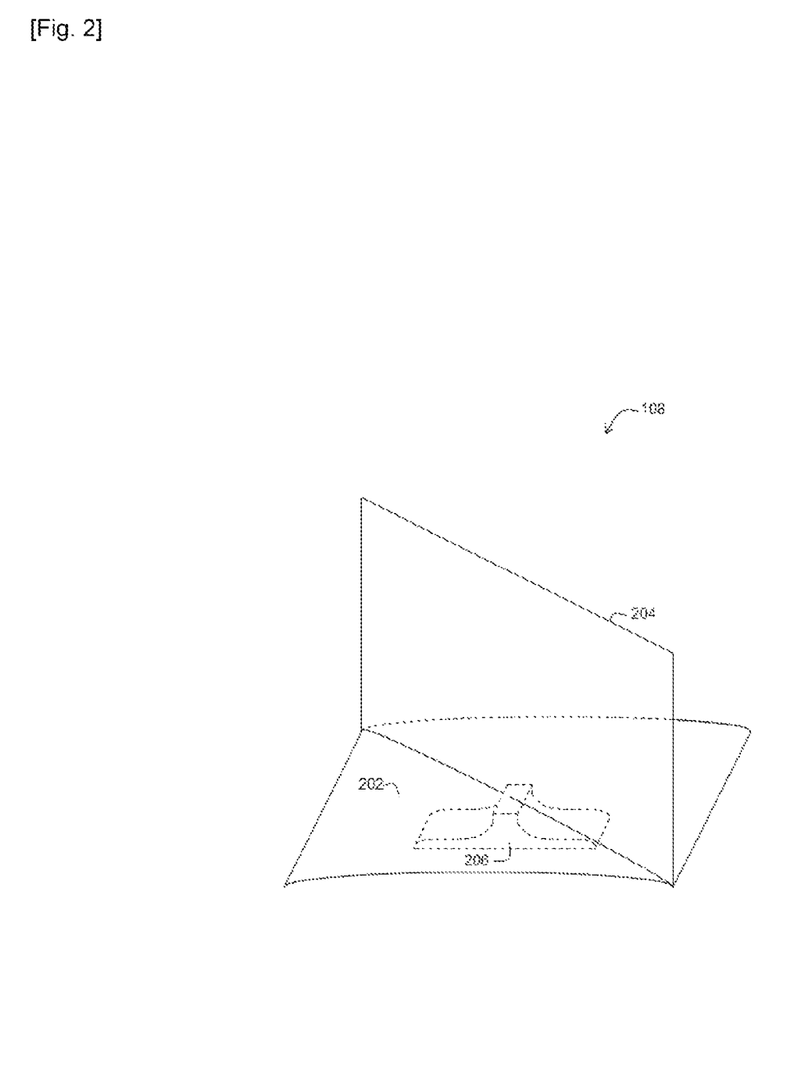
FIG. 2 is a three-dimensional view of one of the vanes to be loaded.

With reference to FIG. 2, an example of a vane 108 will now be described in more detail.

The vane 108 comprises a platform 202 having an internal face intended to be oriented towards the rotor 104 and, conversely, an external face intended to be oriented away from the rotor 104. The vane 108 also comprises a blade 204 projecting from the external face of the platform 202 and, in the example described, a root 206 with a hammer attachment carried by the internal face of the platform 202.

The vanes 108 can be of two types depending on their circumferential size: wide (large circumferential size) or narrow (small circumferential size). This means that the vanes of the same type (wide or narrow) have more or less the same circumferential size. For example, the circumferential size is within the range defined by a nominal circumferential size plus or minus a tolerance. This tolerance is preferably less than 0.2 mm, preferably less than 0.1 mm, for example 0.08 mm. The nominal circumferential size of the wide or narrow vanes 108 is, for example, between 15 and 18 mm (the nominal circumferential size of the wide vanes being greater than that of the narrow vanes). Preferably, the nominal circumferential size difference between the wide and narrow vanes is between 0.1 and 0.5 mm, for example 0.3 mm. The possible circumferential size ranges for the narrow and wide vanes are thus disjointed, with the range for the wide vanes above that for the narrow vanes.

Here are some examples of possible sizes:

Example 1 nominal size of the narrow vanes: 15.12 mm, with a tolerance of 0.08 mm (all the narrow vanes thus have circumferential sizes between 15.04 mm and 15.20 mm), and Nominal size of the wide vanes: 15.42 mm, with a tolerance of 0.08 mm (all the wide vanes have circumferential sizes between 15.34 mm and 15.48 mm).

Example 2 nominal size of the narrow vanes: 15.18 mm, with a tolerance of 0.08 mm (all the narrow vanes thus have circumferential sizes between 15.10 mm and 15.26 mm), and nominal size of wide vanes: 15.48 mm, with a tolerance of 0.08 mm (all the wide vanes have circumferential sizes between 15.40 mm and 15.56 mm).

Example 3 nominal size of the narrow vanes: 16.25 mm, with a tolerance of 0.08 mm (all the narrow vanes thus have circumferential sizes between 16.17 mm and 16.33 mm), and nominal size of the wide vanes: 16.55 mm, with a tolerance of 0.08 mm (all the wide vanes have circumferential sizes between 16.47 mm and 17.03 mm).

Example 4 nominal size of the narrow vanes: 16.98 mm, with a tolerance of 0.08 mm (all the narrow vanes thus have circumferential sizes between 16.90 mm and 17.06 mm), and nominal size of the wide vanes: 17.28 mm, with a tolerance of 0.08 mm (all the wide vanes have circumferential sizes between 17.20 mm and 17.36 mm).

Figure 3:
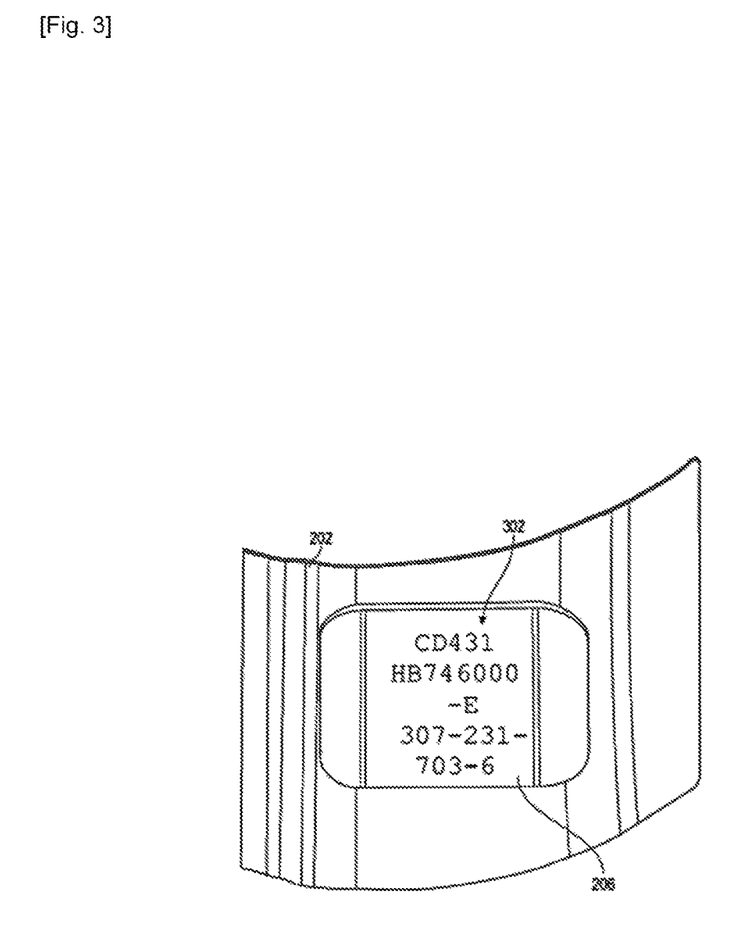
FIG. 3 is a three-dimensional view of a root of the vane in FIG. 2.

With reference to FIG. 3, identification characters 302 are present on the vane 108, for example on its root 206. These identification characters 302 comprise, for example, at least one of: a reference of the vane 108, a serial number and a manufacturer's code. They may also include one or more characters to check the validity of the other characters. The identification characters 302 are preferably engraved, for example by micro-percussion.

Figure 4:
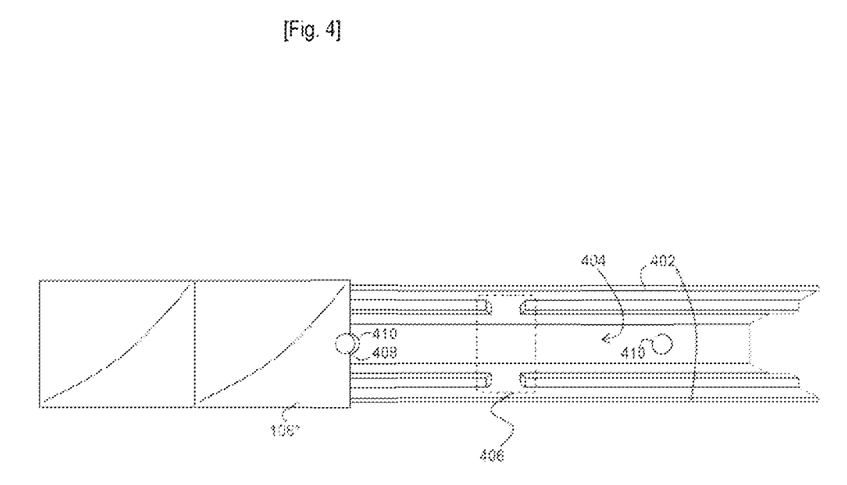
FIG. 4 is a three-dimensional view of a slideway of the wheel, in which the vanes are intended to be loaded.

With reference to FIG. 4, an example of a circular slideway 102A will now be described in more detail, bearing in mind that the other circular slideway 102B is similar.

The circular slideway 102A firstly comprises two circumferential rails 402 on which the internal faces of the platforms 202 of the vanes 108 are designed to rest. The circular slideway 102A also comprises, for example between the two rails 402, a circumferential slot 404 for guiding the roots 206 of the vanes 108. This slot 404 is equipped with a loading notch 406 through which the roots 206 can be inserted into the slot 404 in order to load the vanes 108 onto the circular slideway 102A. The slideway 102A also comprises two bolts 408 (only one is shown in FIG. 4), located on either side of the loading notch 406. In the example described, these bolts 408 are in the form of pins inserted into receiving holes 410 provided in the slot 404. These bolts 408 are designed to cooperate with bolt vanes 108* to lock the vanes 108 loaded in the slideway 102A. In the example described, four bolt vanes 108* are provided. More specifically, two bolt vanes 108* are provided per bolt 408 to come into contact on either side of the latter. In particular, the platform 202 of each bolt vane 108* has a notch for receiving the associated bolt 408.

Figure 5:
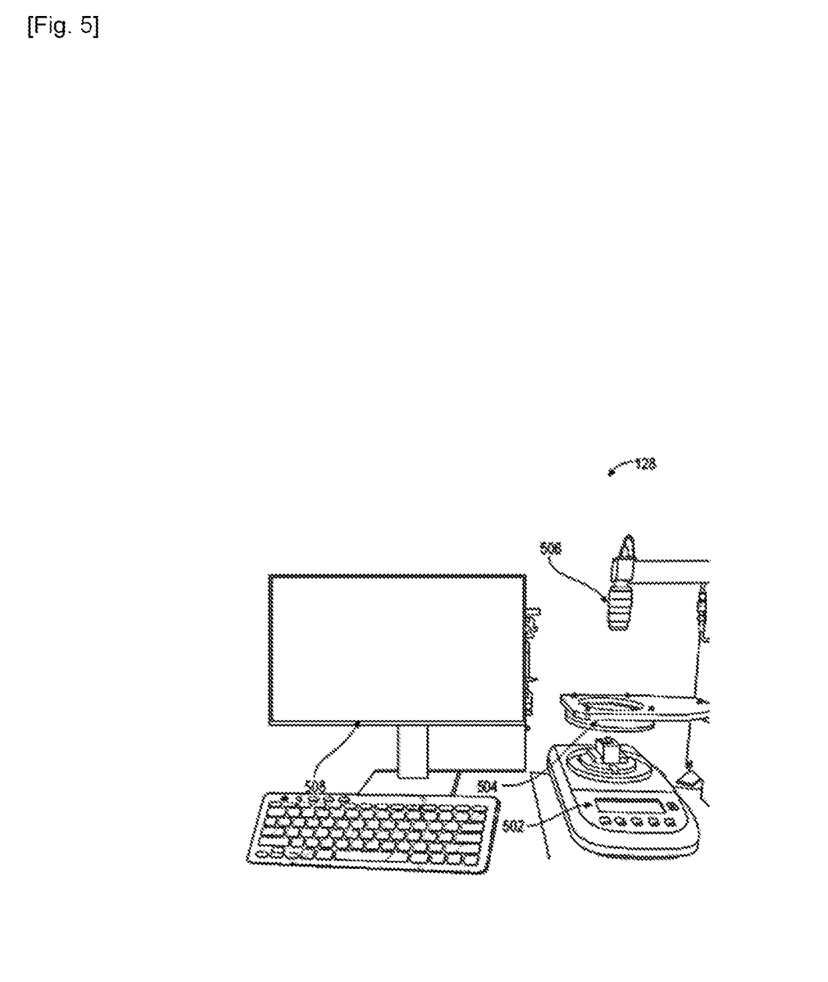
FIG. 5 is a three-dimensional view of a system for identifying the vanes.

With reference to FIG. 5, an example of an identification system 128 will now be described in more detail.

The identification system 128 firstly comprises a scale 502 designed to receive a vane 108 in order to weigh it.

The identification system 128 also comprises a light 504, for example a multi-segment light, designed to illuminate the vane 108 received on the scale from several different lighting directions, for example four different directions.

The identification system 128 also comprises a photography apparatus 506 designed to take photographs of the vane 108 received on the scale 502.

The identification system 128 also comprises a computer device 508 for identifying the vanes. The computer device 508 is designed to implement a machine learning system to overcome the constraints associated both with the precise positioning of the vane on the scale 502 for the image acquisition, and with the variability in the surface finish of the vane and in the quality of the character engraving.

Thus, the computer device 508 is designed to control the lighting to take several photos with different light orientations (according to the four directions in the example described). The computer device 508 is also designed to combine these different images into a single final image in which the characters stand out against the background thanks to the shadows resulting from the different lighting.

The computer device 508 is thus designed to provide this final image to the machine learning system to determine the engraved characters.

In the example described, the machine learning system has been trained beforehand on the basis of a photo library of around 600 vanes. Each character was learnt an average of ten times, with the exception of similar characters (5 and 6, 6 and 8, J and T, etc.) for which more images were labelled.

The computer device 508 is preferably also designed to implement automatic reading error detection algorithms to validate the accuracy and eliminate the potential reading errors.

So, for each vane 108, the computer device 508 is designed, for example, to check that the reference read is as expected (narrow, wide or bolt vane) by comparing with a predefined list. The same applies to the manufacturer's code engraved on the vane.

In addition, the computer device 508 is preferably designed to validate the characters read from the control characters, for example via the checksum algorithm.

The computer device 508 is also designed, for example, to check that the mass of the vane obtained by the balance 502 is within a predefined tolerance range.

Reading errors are therefore identified and the operator performs the corrections by hand, using the photo displayed alongside the characters read.

In addition, the characters that are not read correctly can be fed back into the model to improve it, making the system evolutionary: it improves over time.

Figure 6:
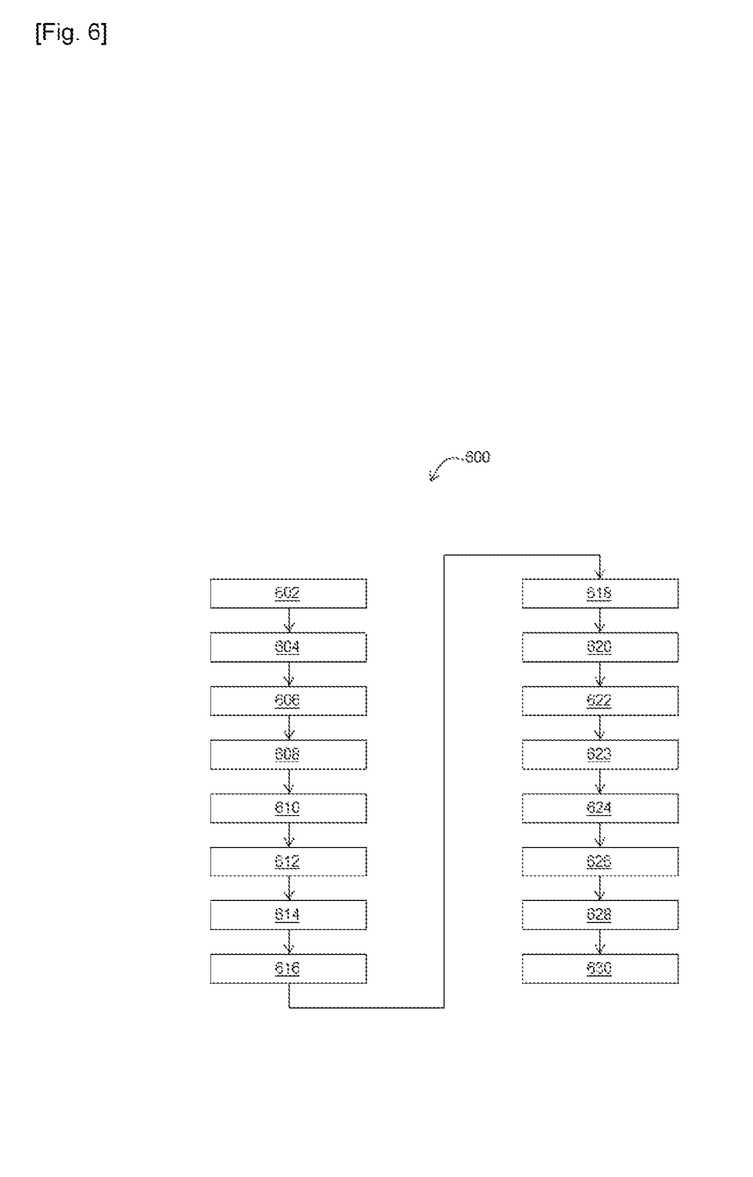
FIG. 6 is a block diagram of a method for loading the vanes onto the wheel.

With reference to FIG. 6, an example of a method 600 for loading the vanes 108 onto the wheel 102A will now be described.

During a step 602, an operator obtains vanes 108, and arranges them on the plate 112 after a visual check, according to an order indicated by the computer device 508. For example, the order is as follows: a "type 1" bolt vane (locating the receiving hole on the right of the platform), a "type 2" bolt vane (locating the receiving hole on the left of the platform), n narrow vanes, N wide vanes, a "type 1" bolt vane, and a "type 2" bolt vane. The numbers n and N can be different from one stage to the next and are, for example, determined beforehand from the mean and standard deviation of the numbers of vanes mounted on previous rotors.

During a step 604, the vanes 108 are identified by means of the identification system 128. For each of the vanes 108, an operator takes the vane 108 from the plate 112 and places it on the scale 502. The automated reading system 108 weighs the vane and reads its serial number. The operator then places the vane 108 back on the plate 112.

In a step 606, the computer device 126 controls the articulated arm 118 and the camera 124 to photograph the plate 112.

In a step 608, the computer device 126 analyses the photograph of the plate 112 to check that no vanes are missing and to determine the positions of the vanes on the plate.

This means that the position of the vanes on the plate is known, even if they have been moved slightly (even unintentionally). As the height of the plate 112 is also known to the computer device 126, the vanes are precisely positioned in the space.

In a step 610, the computer device 126 controls the articulated arm 118 to move the camera 124 to the height of the desired stage by pointing the camera 124 radially with respect to the axis of rotation AA'.

In a step 612, the computer device 126 analyses the image of the camera 124 to locate the loading notch 406 by the camera 124. The computer device 126 then moves the camera 124 along a circle centered on the axis of rotation AA' of the rotor 104, as well as parallel to the axis of rotation AA', while keeping the camera 124 oriented radially, in order to center the position of the notch in the image of the camera 124.

Figure 7:
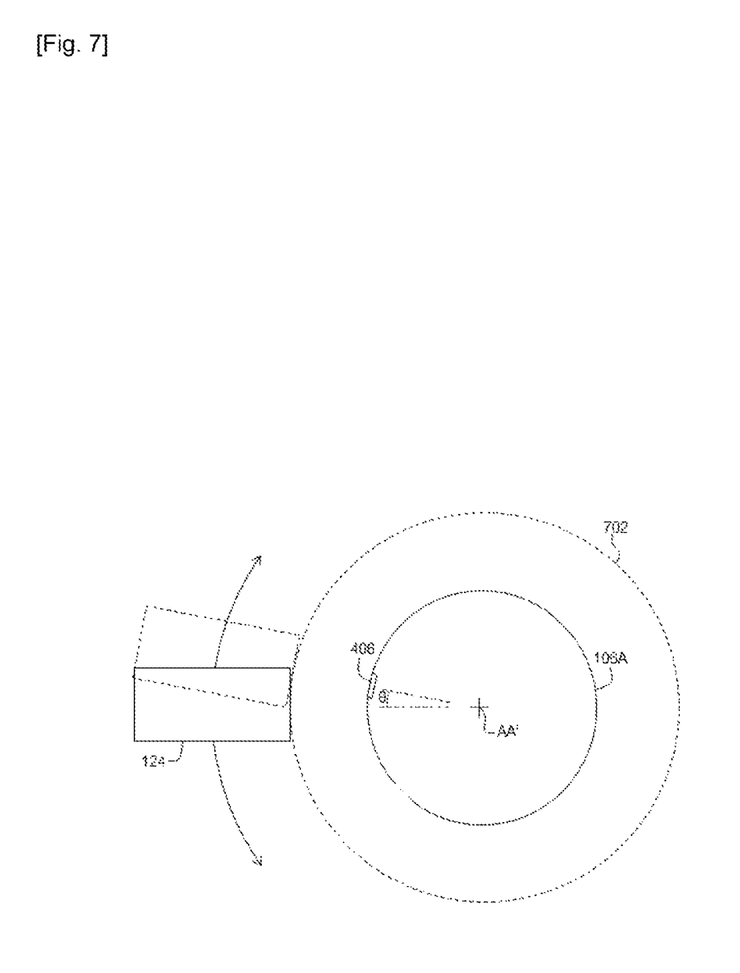
FIG. 7 is a top view of the slideway and a camera of the assembly installation, during the determination of an azimuthal position of the loading notch.

This step 612 is illustrated in FIG. 7, where the circle is referenced 702 and the loading notch 406 has an azimuthal position θ. The loading notch 406 is centered in the image of the camera 124 when the latter is in the position represented by the dotted line.

In this way, the azimuthal position θ and the vertical position Z of the notch 406 can be determined precisely, even if the rotor 104 placed on the frame has rotated about its axis of rotation AA'.

Returning to FIG. 6, in a step 614, the computer device 126 determines the azimuthal position θ and the vertical position Z of the notch 406 from the position of the camera 124 when the notch 406 is centered in the image.

In a step 616, the computer device 126 controls the articulated arm 118 to position the gripper 122 opposite the notch 406.

In a step 618, the computer device 126 controls the articulated arm 118 to move the gripper 122 radially in the direction of the notch 406, and receives the force exerted by the gripper 122 as measured by the measurement system 125.

During a step 619, the computer device 126 detects that the force exceeds a predefined threshold (preferably lower than that used by the safety system) following the encounter of the gripper 122 with the notch 406. In response, the computer device 126 stops the articulated arm 118.

Figure 8:
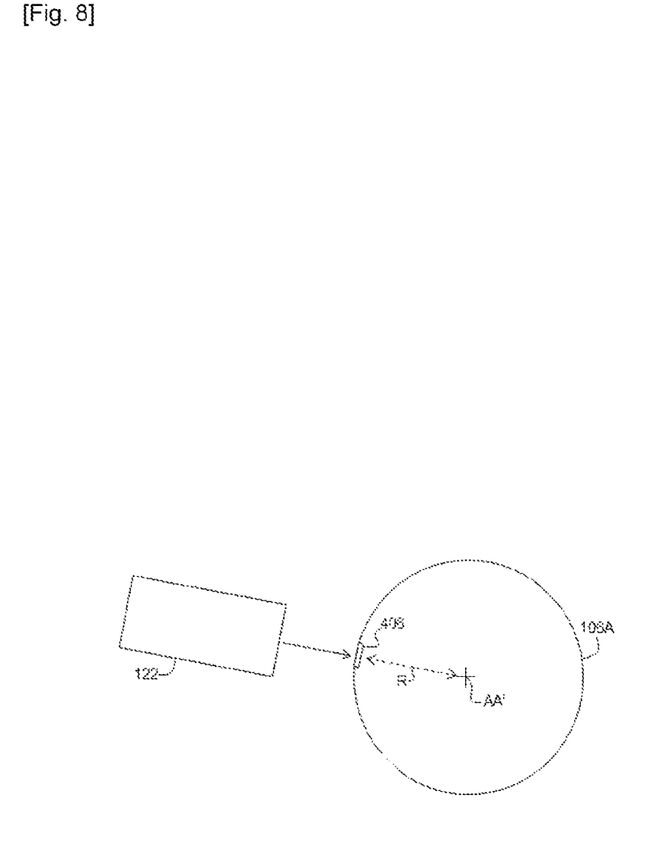
FIG. 8 is a similar view to FIG. 7, when determining a radial position of the loading notch.

This step 619 is illustrated in FIG. 8.

Returning to FIG. 6, in a step 620, the computer device 126 then determines the radial position R of the notch 406 (i.e., the distance radially separating the notch 406 from the axis of rotation AA') from the position of the gripper 122 when the articulated arm 118 was stopped.

Thus, the notch 406 is completely positioned in the space by the vertical position Z, the azimuthal position θ and the radial position R. It is therefore possible for the robot 114 to reach the notch 406 in the loading direction, i.e. in the direction normal to the rotor 104 (radial direction with respect to the axis of rotation AA') to successfully load the vanes 108.

At this stage of the method, the computer device 126 knows the precise location of the loading notch and of each of the vanes 108 present on the plate 112.

The method then continues with the selection of vanes and the determination of the positions of the selected vanes 108 along the slideway 106A to be loaded.

To do this, during a step 622, the computer device 508 of the identification system 128 determines a list of vanes 108 intended to be loaded into the slideway 106A in addition to the bolt vanes 108*. The vanes in this list are thus intended to follow one another along the slideway 106A in the order of this list, following a predefined direction of rotation from the loading notch 406 until they return to this loading notch 406.

At each end of the list, a predefined number of locations are reserved for only wide vanes on one side and only narrow vanes on the other. Preferably, the same number of locations is reserved at both ends of the list. The vanes in these reserved locations are referred to hereafter as "end vanes". The vanes on the list located between these two groups of reserved locations are hereafter referred to as "central vanes". The predefined number of locations reserved at each end, and therefore the number of end vanes at each end, is at least two, preferably at least four, for example six (as in the example to be described later with reference to FIG. 9).

In a step 623, the computer device 126 of the robot 114 receives the list of vanes from the computer device 508 of the identification system 128.

Figure 9:
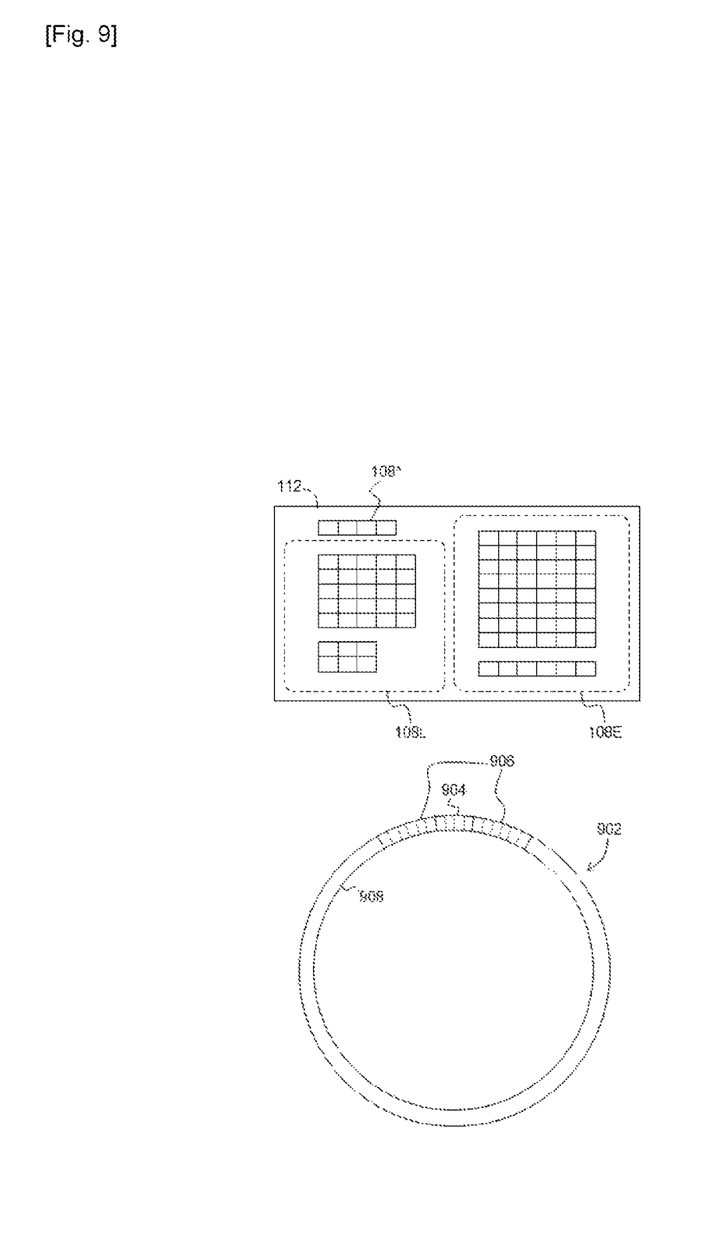
FIG. 9 is a top view of a plate for displaying the vanes and a list defining a vane loading order.

With reference to FIG. 9, an example of the definition of reserved locations will be described in more detail.

In this example, 89 vanes, including 31 wide vanes 108L and 58 narrow vanes 108E, are available and arranged on the plate 112, in addition to the 4 bolt vanes 108*.

77 vanes 108 are designed to be loaded, in addition to the 4 bolt vanes 108*. Thus, the list (shown circularly and designated 902 in FIG. 9) comprises 77 locations, in addition to the four locations (designated by the reference 904 in FIG. 9) for the bolt vanes 108*. Of these 77 locations, 6 are reserved at each end, on one side for wide vanes 108L and on the other for narrow vanes 108E (these wide and narrow vanes will constitute the end vanes). Between these reserved locations (designated by the reference 906 in FIG. 9), 65 locations (designated by the reference 908 in FIG. 9) are available for wide vanes 108L and/or narrow vanes 108E (which will constitute the central vanes).

Once 77 vanes have been selected for loading, there are 12 vanes remaining.

As will be explained later, the locations 906 reserved at each end of the list make it very easy to replace narrow end vanes for remaining wide vanes, or wide end vanes for remaining narrow vanes, in order to adjust the circumferential clearance of the loaded vanes.

To ensure that these replacements have little effect on the unbalance of the loaded vanes, each end vane and each remaining vane is preferably lighter than each of the central vanes.

In the example described, the vanes 108 are placed by the computer device 508 in the list 902 in the following way. The vane with the highest weight is placed in the middle of the list. A vane is then placed successively to the right and left of the vane or vanes already placed, in descending order of weight of the vanes (whether wide or narrow). This means that the heaviest vanes are positioned opposite the bolts, facing the latter, which allows to keep the imbalance low.

When all the central locations of the list 902 have been filled (i.e. the locations of the list located between the reserved end locations), the computer device 508 places only narrow vanes, of the remaining narrow vanes, in the end locations reserved for the narrow vanes, in descending order of weight towards the end of the list 902 (towards the locations 904 for the bolt vanes 108*). Similarly, the computer device 508 places only wide vanes, of the remaining wide vanes, in the end locations reserved for the wide vanes, in descending order of weight towards the end of the list (towards the locations 904 for the bolt vanes 108*).

In the example described, the remaining vanes are therefore the lightest.

During a step 624, the computer device 126 controls the articulated arm 118 and the gripper 122 so that the latter seizes the plate 112 and inserts the vanes 108 one by one, according to the list determined previously, into the notch 406. To load the vanes 108 into the notch 406, the computer device 126 uses its previously determined spatial position. In the example described, each new vane loaded pushes the previous ones.

In a step 626, an operator places the bolts 408 and the bolt vanes 108* to lock the vanes 108 loaded.

In a step 628, an operator measures the circumferential clearance of the loaded vanes 108 and compares it with a desired circumferential clearance.

During a step 630, if the circumferential clearance is too small, the wide end vanes are easily accessible and the operator removes one or more of them (after removing the bolts 408 and the bolt vanes 108*) to replace them with one or more of the remaining narrow vanes, generally by the same number. Similarly, if the circumferential clearance is too great, the narrow end vanes are easily accessible and the operator removes one or more of them (after removing the bolts 408 and the bolt vanes 108*) to replace them with one or more of the remaining wide vanes, generally the same number.

Because the end vanes and the remaining vanes are the lightest, replacement does not lead to any significant change in unbalance.

In this way, the circumferential clearance is adjusted without the need to remove and then reload all the vanes 108.

It will be further noted that the invention is not limited to the embodiments described above. In fact, it will appear to the person skilled in the art that various modifications can be made to the above-described embodiments, in the light of the teaching just disclosed.

In the foregoing detailed presentation of the invention, the terms used should not be interpreted as limiting the invention to the embodiments exposed in the present description, but should be interpreted to include all equivalents the anticipation of which is within the reach of the person skilled in the art by applying his general knowledge to the implementation of the teaching just disclosed.

The invention claimed is:

1. A method for loading vanes onto a wheel comprising a circular slideway having a notch for loading the vanes, by means of an articulated arm having one end equipped with a vane gripper, the method comprising:
   determining a list of vanes intended to succeed one another along the slideway in the order of this list, following a predefined direction of rotation from the notch until returning to this notch, so that the list has a predefined number of vanes at a first end, referred to as first end vanes, and a predefined number of vanes at a second end of the list, referred to as second end vanes, each of the first end vanes having a smaller circumferential size along the circular slideway than each of the second end vanes; and
   controlling the articulated arm so that the gripper seizes and loads the vanes into the notch in the order listed.

2. The method of claim 1, wherein each of the vanes in the list between the first and second end vanes has a greater weight than each of the first and second end vanes.

3. The method of claim 2, wherein the vanes in the list have decreasing weights from a middle of the list towards each end of the list.

4. The method according to claim 1, further comprising:
   measuring a circumferential clearance of the loaded vanes;
   if the circumferential clearance is too small, replacing one or more first end vanes with one or more vanes of larger circumferential size; and
   if the circumferential clearance is too large, replacing one or more second end vanes with one or more vanes having a smaller circumferential size.

5. The method according to claim 1, wherein the articulated arm comprises a safety system for measuring a force exerted on the gripper and stopping the articulated arm when this force exceeds a predefined threshold, comprising:
   controlling the articulated arm to position the gripper radially opposite, with respect to an axis of rotation (AA') of the rotor, a notch provided in the stage for inserting the vanes;
   controlling the articulated arm to move the gripper radially in the direction of the notch until the articulated arm is stopped by the safety system following the encounter of the gripper with the rotor; and
   determining a radial position (R) of the notch from the position of the gripper when the articulated arm has been stopped by the safety system;
   and in which controlling the articulated arm to load the vanes comprises inserting the vanes one by one into the notch at the determined radial position, in the order of the list.

6. The method according to claim 5, wherein a camera is attached to the end of the articulated arm and further comprising:
   controlling the articulated arm to move the camera along a circle centered on the axis of rotation (AA') of the rotor, as well as parallel to the axis of rotation (AA'), while keeping the camera oriented radially, in order to center the position of the notch in the image provided by the camera; and
   determining an azimuthal position (θ) and along the axis of rotation (Z) of the notch, the control of the articulated arm so that the gripper seizes and inserts the vanes one by one into the notch also being carried out on the basis of the azimuthal positions (θ) and along the axis of rotation (Z) determined.

7. The method according to claim 5, further comprising:
the photograph of a plate on which the vanes to be loaded are arranged; and
analysing the photograph to determine the positions of the vanes on the plate.

8. The method according to claim 1, wherein the wheel belongs to a rotor of a turbojet engine.

\* \* \* \* \*